United States Patent
Maynard et al.

(10) Patent No.: US 7,567,995 B2
(45) Date of Patent: Jul. 28, 2009

(54) METHOD AND APPARATUS FOR THE DEFRAGMENTATION OF A FILE SYSTEM

(75) Inventors: Nicholas C. Maynard, Winchester (GB); Kieran P. Scott, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 11/466,140

(22) Filed: Aug. 22, 2006

(65) Prior Publication Data

US 2007/0050390 A1 Mar. 1, 2007

(30) Foreign Application Priority Data

Aug. 24, 2005 (GB) .................................. 0517305.9

(51) Int. Cl.
G06F 12/00 (2006.01)
G06F 17/30 (2006.01)
G06F 15/16 (2006.01)

(52) U.S. Cl. .................. 707/205; 707/206; 711/100

(58) Field of Classification Search .............. 707/205, 707/206, 101, 202; 360/48
See application file for complete search history.

(56) References Cited

U.S. PATENT DOCUMENTS

| | | | | |
|---|---|---|---|---|
| 5,398,142 A * | 3/1995 | Davy | .................. | 360/48 |
| 5,930,828 A * | 7/1999 | Jensen et al. | ................. | 711/170 |
| 6,070,172 A * | 5/2000 | Lowe | ................. | 707/205 |
| 6,253,300 B1 | 6/2001 | Lawrence et al. | ........... | 711/173 |
| 6,253,330 B1 * | 6/2001 | Denkin et al. | ............... | 713/300 |
| 6,397,311 B1 * | 5/2002 | Capps | ................. | 711/165 |
| 6,735,678 B2 * | 5/2004 | Noble et al. | ................. | 711/165 |
| 7,373,477 B2 * | 5/2008 | Takase et al. | ............... | 711/202 |
| 2001/0047451 A1 * | 11/2001 | Noble et al. | ................. | 711/111 |

* cited by examiner

*Primary Examiner*—Tony Mahmoudi
*Assistant Examiner*—Dennis Truong
(74) *Attorney, Agent, or Firm*—Arthur Ortega (57) ABSTRACT

A method, system and computer program product for the defragmentation of a file system with little or no free space. Defragmenting file fragments in a memory file system comprises determining a defragmentation sequence for re-ordering fragments of files in the file system; determining if at least one fragment in the file system is moved more than once in the defragmentation sequence; removing the at least one fragment from the file system if it is moved more than once in the sequence; determining the defragmentation sequence without considering the at least one removed file fragment; rearranging the remaining file fragments on the file system according to the determined defragmentation sequence; and replacing the removed file fragments in the file system after the defragmentation.

2 Claims, 7 Drawing Sheets

Before Defragmentation

Figure 4A

During Defragmentation

Figure 4B

Partial defragmentation

Figure 4C

Final defragmentation

Figure 4D

METHOD AND APPARATUS FOR THE DEFRAGMENTATION OF A FILE SYSTEM

This invention relates to a method and apparatus for the defragmentation of a file system. In particular this relates to a method and apparatus for defragmentation of a file system with little or no free space.

BACKGROUND

Defragmentation of a file system with a small amount of free space can be extremely slow and/or impossible due to defragmentation application limitations. Currently the only way to accelerate the defragmentation process on such a file system is to free space on the file system to be defragmented prior to the defragmentation process. This can be achieved by manually removing a file or moving it to another disk drive temporarily. The problem with this method is that it would not be known if the removal of the file freed enough space or even freed more than required and a certain level of user trial and error is needed.

U.S. Pat. No. 6,253,300, PowerQuest Corp, discloses data manipulation during partition imaging whereby data may be defragmented during the process of copying it from one partition to another. However, U.S. Pat. No. 6,253,300 does not describe defragmentation of a particular partition nor using multiple partitions to defragment a single partition.

SUMMARY OF INVENTION

According to a first aspect of the present invention there is provided a method of defragmenting file fragments in a file system comprising: determining a defragmentation sequence for re-ordering fragments of files in the file system; determining if at least one fragment in the file system is moved more than once in the defragmentation sequence; removing the at least one fragment from the file system if it is moved more than once in the sequence; rearranging the remaining file fragments on the file system according to the determined defragmentation sequence; and replacing the removed file fragments in the file system after the defragmentation.

A file system is a system for storing and organising files e.g. a partition on a disk drive. The embodiment considers a file fragmented across a single file system.

Preferably, the method comprises further determining the defragmentation sequence without considering the at least one removed file fragment thereby a new more efficient defragmentation of the partition will take place.

Advantageously a method comprises further determining if the further determined defragmentation sequence contains a further at least one fragment that is moved more than once in the defragmentation sequence; and removing the further at least one fragment from the file system and further determining the defragmentation sequence without considering the further removed at least one fragment. In this way the defragmentation efficiency improve by iterative determination.

A further determined defragmentation sequence may be obtained by modifying the original defragmentation sequence whereby the references to the removed fragments are removed.

If a fragment of a file is moved more than once in the defragmentation sequence then removing all the associated file fragments from the file system.

By allowing the defragmentation process to free space on the source file system the process can be accelerated. Defragmentation using of free space on file systems during the defragmentation process is preferable to requiring the user to manually free space on the file system to be defragmented.

DESCRIPTION OF DRAWINGS

Embodiments of the invention will now be described, by means of example only, with reference to the accompanying drawings in which.

DESCRIPTION OF THE EMBODIMENTS

Figure 1:
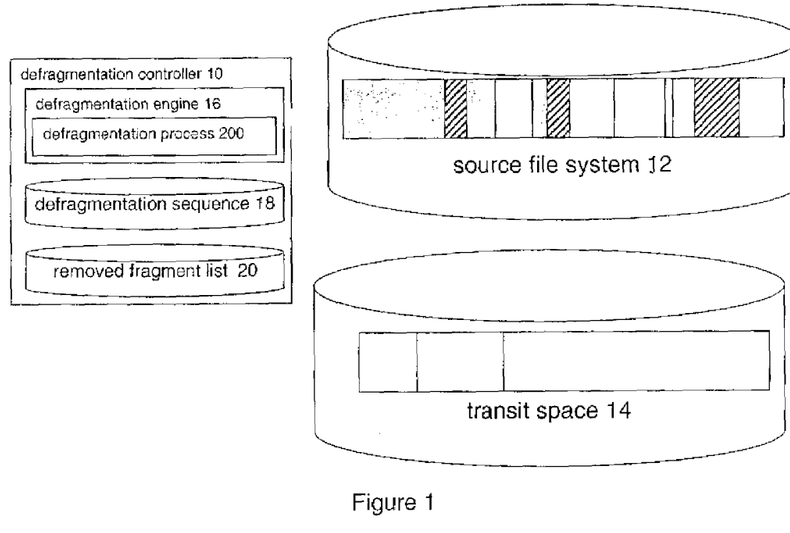
FIG. 1 is a schematic of the defragmentation controller, fragmented source file system, and transit space.

FIG. 1 is a schematic of the defragmentation controller 10; the source file system 12 and transit space 14. The transit space 14 is shown on a file system, e.g. a disk drive partition, but it could be on any resource available to the controller including fast persistent memory and network space. To ensure data integrity the transit space should be non-volatile storage.

Defragmentation controller 10 comprises: defragmentation engine 16; and storage for defragmentation sequence 18 and removed fragment list 20.

Defragmentation engine 16 performs defragmentation process 200. During the defragmentation process 200 defragmentation sequence 18 is generated. The defragmentation sequence is a sequential instruction set for moving fragments on the source file system to new locations to form contiguous data. Also generated in the defragmentation process is a list of removed fragments 20, these fragments are removed from the source file system and not included in the subsequently re-determined defragmentation sequence. The removed fragments are replaced after the defragmentation sequence is executed. In the described embodiments the removing and replacing of the removed fragments is not part of the defragmentation sequence but this is a design choice and could be different in other embodiments.

Figure 2:
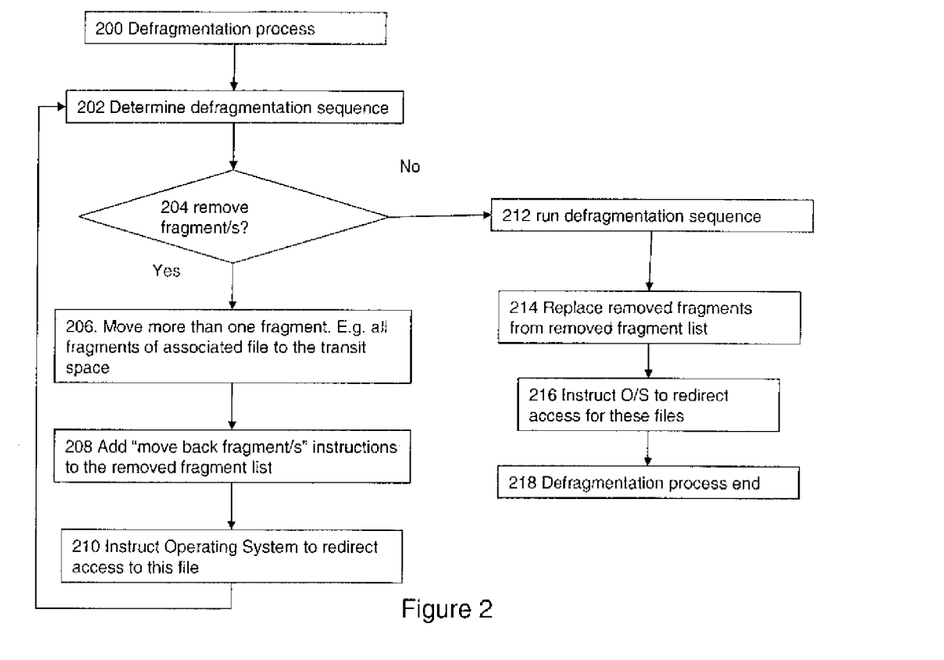
FIG. 2 is a schematic of the method of defragmentation of the present embodiment.

FIG. 2 describes the defragmentation method 200 of defragmentation controller 10.

In step 202, the defragmentation engine 16 determines a defragmentation sequence 18 using a known defragmentation algorithm. A defragmentation algorithm determines an efficient way of moving fragments within a file system by minimizing the total number of moves for all the fragments. The initial output of step 202 is a list of sequence steps for moving all of the fragments to achieve a contiguous set of file data. This is known in the prior art.

In step 204, the defragmentation engine 16 determines from the sequence 18 which fragments are moved multiple times within the file system and whether it would be more efficient to temporarily remove this multi-moved fragment from the file system rather than move it about the file system multiple times. The preferred embodiment will remove from the source file system at least one fragment that is moved more than twice in the source file system since this fragment would then only be moved twice in the removal and replacement steps. The free space created by the removal of the at least one fragment will reduce the number of multi-move fragments when the defragmentation sequence is re-determined. In a second embodiment at least one twice-moved fragment would be moved since this would further reduce if not eliminate the number of twice-moved fragments when the defragmentation sequence is re-determined.

In the preferred and second embodiment a single more than twice-moved fragment is selected and removed from the source file system in one go at step 206. More fragments may be removed when the process repeats and after a new defragmentation sequence is determined in step 202.

In an optional variation to the preferred and second embodiments, several multi-moved fragments are removed from the file system at step 206. This would be beneficial in a system having a fast transit space. This saves the process having to remove fragments in a further iteration of the process 200 and having to calculate the defragmentation sequence more than two times. One simple way to do this is to remove all multi-moved fragments in step 206 which would ensure no fragments will require multiple moves next time the defragmentation sequence is calculated. One advantage of removing all the multi-moved fragments from the source file system is that it is not necessary to re-determine the defragmentation sequence since the original defragmentation sequence can be used without reference to the removed fragments.

A more complex method of removing more than one multi-move fragment could remove a percentage of the multi-move fragments and still eliminate or reduce multi-move fragments.

It is possible to use the original defragmentation sequence in other embodiments without reference to the removed fragments. This would be an improvement over not removing a multi-move fragment but faster defragmentation would occur with a re-determined defragmentation sequence. The transit space size also determines what fragments are moved but in this embodiment it is assumed that the transit space is unlimited.

Step 206 is the optional step in which further fragments are also removed from the file system (step 206). In this example associated file fragments that belong to the same file are removed.

In step 208, references to the removed fragment/s are added to the removed fragment list 20.

Following the example of complete file removed in step 206, the operating system is requested to redirect access to the removed file in step 210. This allows access to the file during defragmentation.

After step 210, control returns to step 202 a new defragmentation sequence 18 is determined to replace the old defragmentation sequence.

After the new defragmentation sequence is determined (step 202) a further decision, step 204, to remove further fragments is made. In embodiments where a new defragmentation sequence is not determined it is this step which modifies the original defragmentation sequence.

The process repeats steps 206, 208 and 210 if further fragments are to be removed. The decision depends on the particular embodiment but if no further fragments are to be removed then control passes to step 212.

In step 212 the defragmentation sequence 18 is executed and fragments on the source file system are moved to reorder them so that they form contiguous files.

In step 214, removed fragments identified from the removed fragment list are replaced in the source partition to form contiguous files along with the reordered fragments.

In step 216, the operating system is instructed to redirect access for the replaced files.

Step 218 is the end of the method.

It will be clear to one skilled in the art that the method of the present invention may suitably be embodied in a logic apparatus comprising logic means to perform the steps of the method, and that such logic means may comprise hardware components or firmware components.

Figure 3:
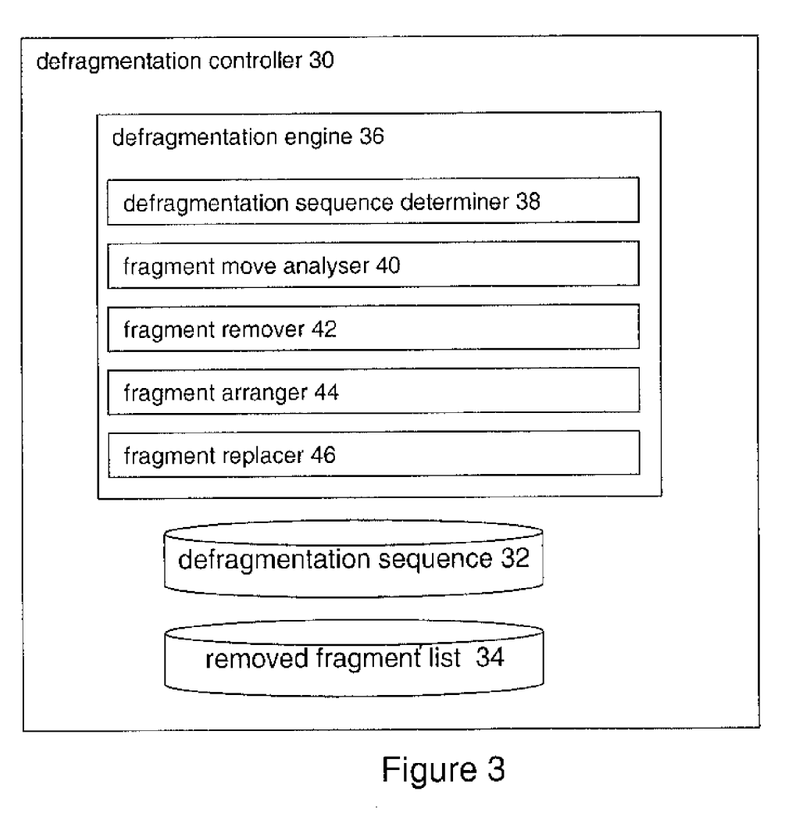
FIG. 3 is a schematic of a defragmentation controller of a logic embodiment.

For instance, FIG. 3 shows a logic apparatus embodiment of defragmention controller 30. Defragmentation controller 30 comprises defragmentation engine 36; defragmentation sequence 32 and removed fragment list 34. Defragmentation engine 32 comprises: defragmentation sequence determiner 38 for re-ordering fragments of files in the file system; fragment move analyser 40 for determining if at least one fragment in the file system is moved more than once in the defragmentation sequence; fragment remover 42 for removing the at least one fragment from the file system if it is moved more than once in the sequence; fragment arranger 44 for arranging the remaining file fragments on the file system according to the determined defragmentation sequence; and fragment replacer 46 for replacing the removed file fragments in the file system after the defragmentation.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

FIGS. 4A, 4E, 4C and 4D show an example source file system and transit partition before, during and after defragmentation process 200.

Figure 4A:
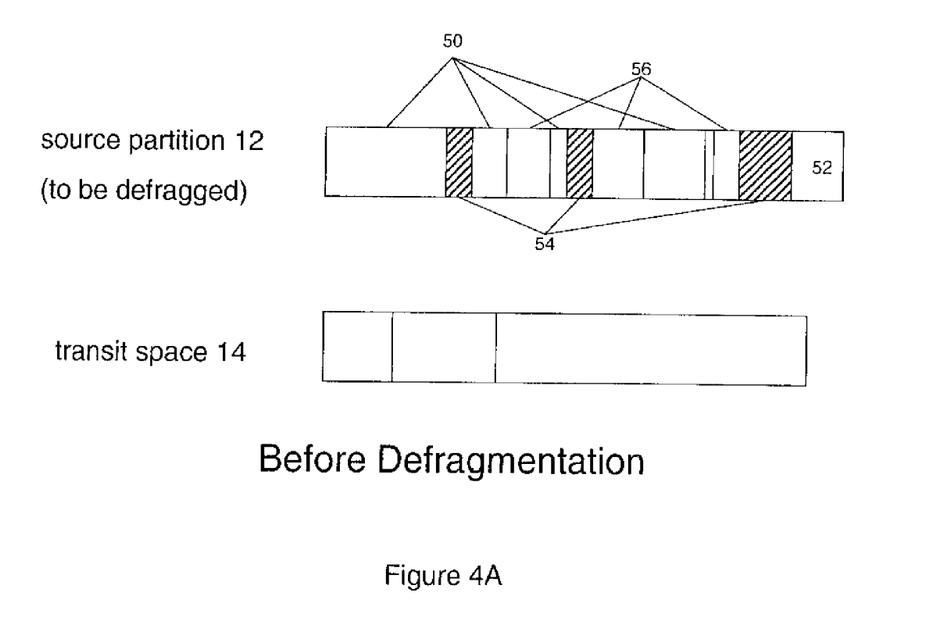
FIGS. 4A, 4B, 4C and 4D show the stages of fragments in an example file system during the defragmentation according to the present embodiment.

FIG. 4A shows an example source partition and transit partition before defragmentation. The defragmentation sequence has been determined and in this case at least one of the fragments 50 (brick shading) needs to be moved more than once because of the lack of free space 52 on the source file system. The other fragments which do not need to be moved more than once are fragments 54 (diagonal shading) and fragments 56 (vertical shading).

Figure 4B:
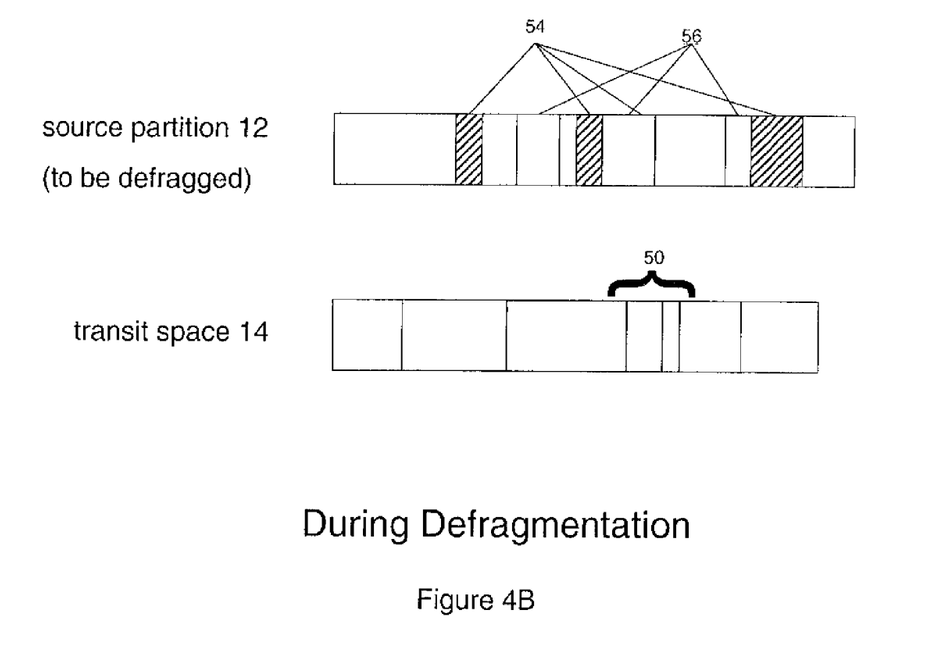

FIG. 4B shows the example source partition and transit partition during defragmentation. All fragments 50 have been removed from the source file system 12 to the transit space 14. File access is redirected for the removed file to the transit space 14. References to the fragments 50 are placed in the removed fragment list 20. Now the source disk has more free space for defragmentation of the remaining files. Re-determination of the defragmentation sequence is performed on the source file system. In this example the remaining instructions each require only one move per fragment, so a normal defragmentation process is performed on the remaining files.

Figure 4C:
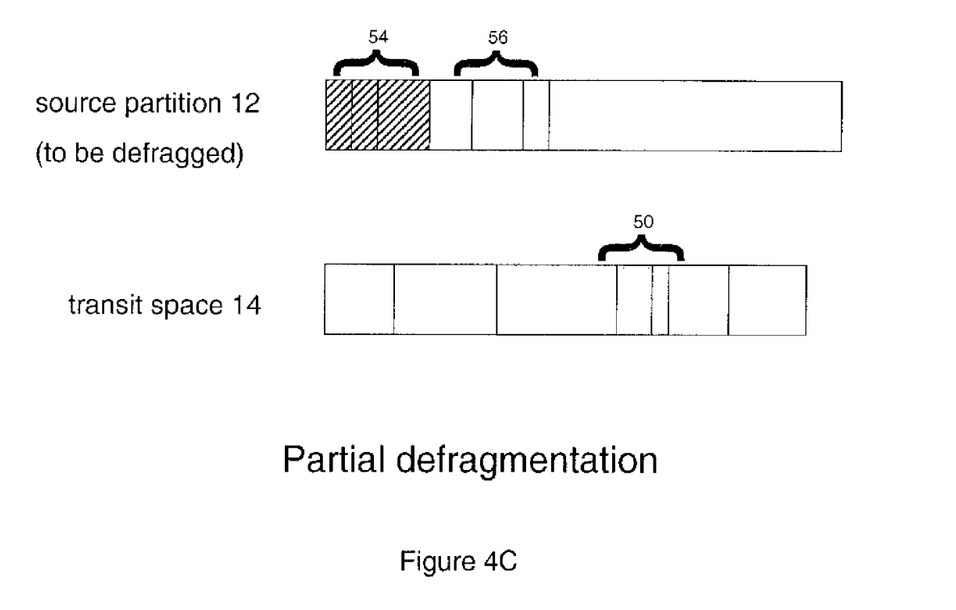

FIG. 4C shows that the source disk has been defragmented and fragments 54 and 56 are in contiguous locations after the defragmentation sequence has been completed.

Figure 4D:
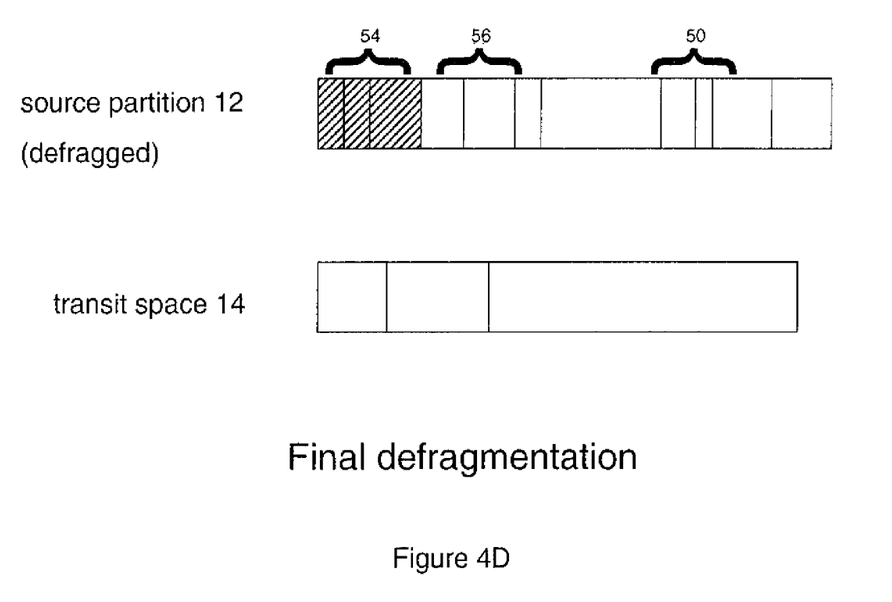

FIG. 4D shows that the moved file fragments 50 on the transit space have been moved back to the source disk 12 into their intended contiguous file locations.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for
example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer service on demand.

It will also be appreciated that various further modifications to the preferred embodiment described above will be apparent to a person of ordinary skill in the art.

The invention claimed is:

1. A method of defragmenting file fragments in a file system comprising the steps of:
   determining an initial defragmentation sequence for re-ordering the file fragments in the file system;
   determining if at least one fragment in the file system is moved more than once in the initial defragmentation sequence;
   removing the at least one fragment from the file system if the at least one fragment is moved more than once in the initial defragmentation sequence;
   determining a subsequent defragmentation sequence without considering the at least one removed file fragment;
   determining if the subsequent defragmentation sequence contains a subsequent at least one fragment that is moved more than once in the subsequent defragmentation sequence;
   removing the subsequent at least one fragment from the file system and further determining the defragmentation sequence without considering the removed subsequent at least one fragment;
   obtaining the subsequent determined defragmentation sequence including modifying the initial defragmentation sequence whereby references to the removed fragments are removed;
   rearranging the remaining file fragments on the file system according to the subsequent determined defragmentation sequence; and
   replacing the removed file fragments in the file system after the subsequent defragmentation sequence.

2. The method according to claim 1 further comprising the step of removing all the associated file fragments from the file system if a fragment of a file is moved more than once in the initial defragmentation sequence.

* * * * *